March 23, 1937.  H. C. ILLIUM  2,074,587
ADVERTISING DISPLAY
Filed May 4, 1936
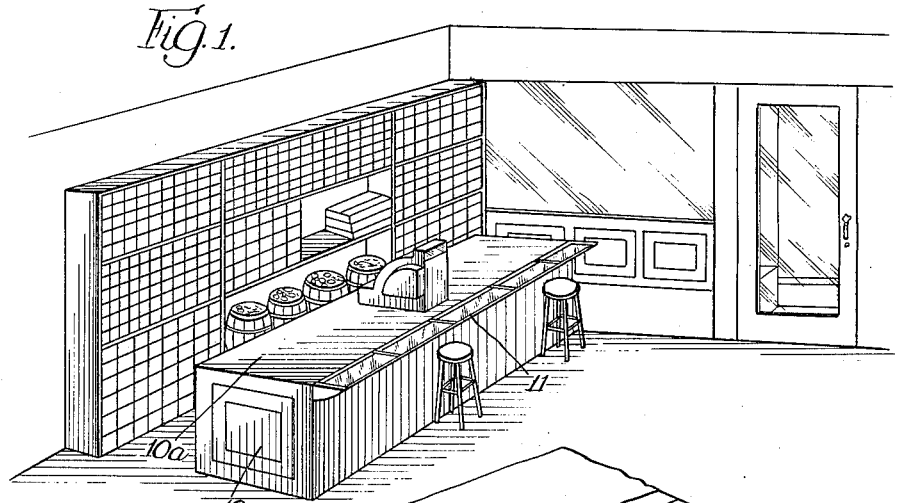
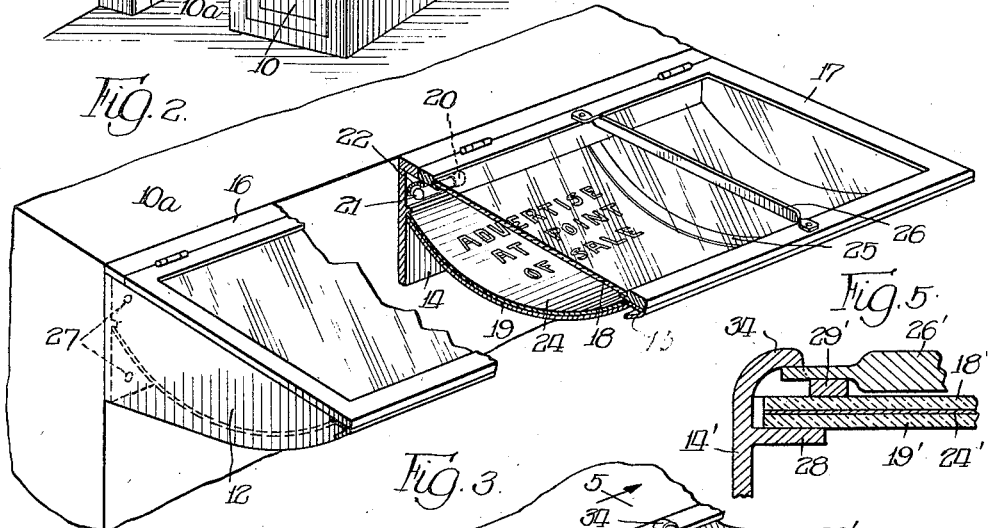
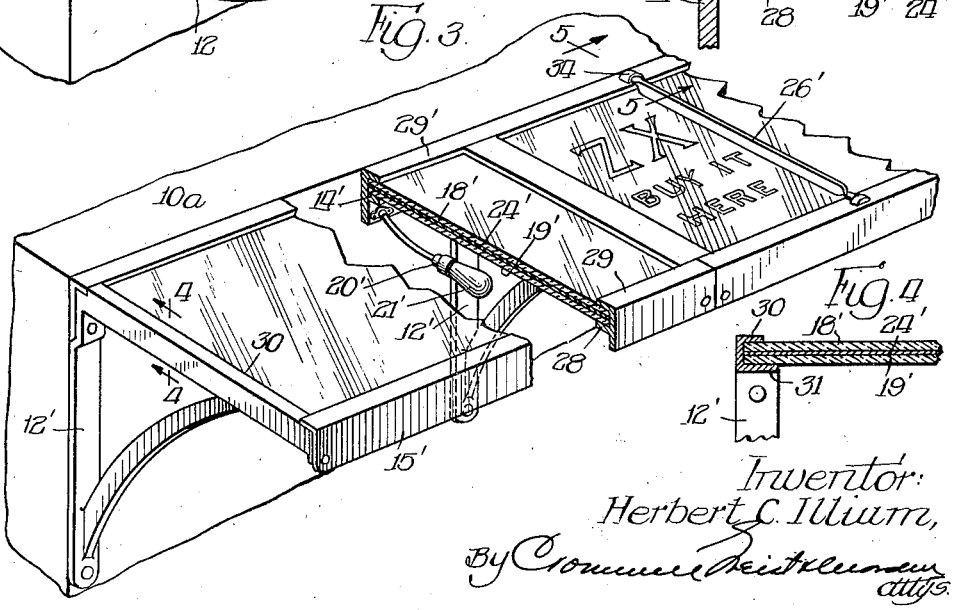
Inventor:
Herbert C. Illium, Patented Mar. 23, 1937

2,074,587

UNITED STATES PATENT OFFICE 2,074,587

ADVERTISING DISPLAY

Herbert C. Illium, Wilmette, Ill.

Application May 4, 1936, Serial No. 77,681

10 Claims. (Cl. 40—64)

This invention relates to means for displaying advertising matter in the nature of cards, sheets, or the like.

Merchandisers quite generally recognize the advantages of display advertising at the point of purchase, particularly in connection with advertising which is brought to the attention of the public generally in publications such as newspapers and magazines or through spot advertising in the nature of billboards, etc. Such advertising at the point of sale, or retail store where the advertised product is kept in stock, serves as an immediate reminder to the customer in the store, and constitutes in effect a follow-up of advertising which has previously been brought to the customer's attention through the other media. Consequently, the point of purchase display advertising, in actual experience, has been found most effective in promotion of sales, as it enables the advertiser to realize more fully on the influence of the advertising which he presents to the public in publications, billboards, by radio broadcast, or other media.

Facilities for point of purchase advertising are, however, distinctly limited. The retail storekeeper, who makes the actual sale of the product to the purchaser, has comparatively little space available for display of advertising matter. He requires his wall space for shelving or the like to hold the various commodities which he sells, and he requires his floor space for display of merchandise and for counters or the like on which merchandise is placed for examination by the customers or wrapped when a sale is made. Consequently, while the manufacturers or makers of various products may supply the retailer with various display cards and the like intended to be set up on a counter or hung on the wall, the retailer in most instances is not able to spare the space for them, and even if they are placed on the counter they are usually in the way and become knocked about, soiled and defaced, and are soon done away with.

The present invention is designed to afford the advertiser increased opportunity for display advertising at the point of purchase, and to afford the storekeeper additional facilities for display of advertising matter conveniently and without encroachment upon his working counter space.

A general object of the invention is the provision of means for thus enlarging the possibilities of display advertising at the point of purchase, to afford the storekeeper and the customer additional counter space for the transaction of their business, to present the display advertising to the store customers in such a location that it is brought directly and impressively to their attention, and to preserve and protect the advertising matter against derangement and defacement and against removal from its advantageous display location.

Another object of the invention is the provision of means adapted to accomplish the above mentioned results and which can be installed and serviced with facility.

Other and further objects will be pointed out or indicated hereinafter or will be apparent upon an understanding of the invention or its employment in use.

To aid in an explanation of the invention I show in the accompanying drawing forming a part of this specification, and hereinafter described, certain forms or embodiments of means illustrative of the invention. It is to be understood, however, that these are presented merely for the purpose of illustration, and hence that it is not to be construed in any fashion calculated to limit the appended claims short of the true and most comprehensive scope of the invention in the art.

In the drawing,

Fig. 1 is a representation of an interior portion of a retail sales room;

Fig. 2 is a broken perspective view of one embodiment of the invention;

Fig. 3 is a similar broken perspective view of another embodiment of the invention;

Fig. 4 is a sectional detail on line 4—4 of Fig. 3; and

Fig. 5 is a sectional detail on line 5—5 of Fig. 3.

The nature of the invention will be most quickly ascertained from a description of the embodiments shown in the drawing.

Referring to the various parts as designated by the reference numerals, let it be understood that the reference numeral 10 designates a counter, which may be of any appropriate form and construction, such as a table or otherwise, same having a top 10a at a level appreciably below that of the eyes of the average adult. Such a counter is customarily used in retail stores to support merchandise when it is presented to the customer for examination, and also is customarily used for the wrapping of the goods and for the laying down of money and change passed from purchaser to salesman and vice versa, as well as for numerous other purposes.

As a supplement to the working surface of such counter and as a means for supporting and protecting advertising matter I provide the counter with a forwardly projecting extension 11 of suitable convenient width, and of such length as may be desired up to the length of the counter. This projecting portion may be formed of a series of units placed end to end, which units may be of any convenient length, for example 30 or 40 inches.

One of such units is illustrated in Fig. 2. It comprises a pair of strong and rigid end brackets 12 which are formed as a part of or are firmly secured to a rear connecting member 14 and connected at their outer or forward ends by a stiff strip or rail 15. Hinged to the connecting member, or to a longitudinally extending strip 16 secured to the brackets, is a rectangular frame 17 which is glazed with a pane or panes of transparent glass or other rigid transparent material 18. A sheet-supporting plate 19 is mounted on the brackets below the frame 17, which plate may be made of metal, wood or other suitable material, and in Fig. 2 it is shown in a concave form. The frame 17 is adapted to close and rest upon the upper surfaces of the brackets 12 and the rail 15 and may be provided with suitable locking means to keep it closed. It may be swung upwardly and rearwardly to afford access to the plate 19. One or more electric light sockets 20 are mounted on the connecting member 14 in such fashion as to support an electric light bulb or bulbs 21 under the rearward portion of the frame. A suitable reflector 22 may be associated with said light fixtures to reflect light from the bulb downwardly upon the plate 19.

The plate 19 is adapted to support an advertising sheet or sheets 24, which may be of paper, cardboard or other suitable material and provided with advertising legends, pictures, etc. on its upper surface. When placed on the plate 19 the sheets conform to its curvature, and may be held in place by flat spring strips 25 overlapping their margins. Guard members 26 may be mounted on the frame 17, arranged at suitable intervals, to carry the weight of articles laid upon them and thus protect the pane 18.

Such a unit is securely affixed to the counter, as by means of bolts 27, in such fashion that its top is substantially flush with the top or work surface 10a of the counter and so that it will be strongly supported in that position and constitute in effect an extension of such work surface. In Fig. 1 is shown an arrangement of five such units end to end, forming a continuous shelf extension along the counter top.

The advertising matter displayed by the sheets 24 is thus presented directly under the eye of the customer at the counter and is effectively illuminated so as to attract his attention. Such advertising matter may be replica of page advertisements or the like carried by the advertiser in publications or presented elsewhere on billboards, and thus serves to tie in such other advertising of the product with the particular point or store where the product may be purchased. The advertising sheets may be changed from time to time so as to keep the point of purchase display synchronized with the advertising in periodicals, etc., and such servicing of the unit is accomplished easily as the sheets may be readily changed when the frame 17 is swung to an open position.

It will be noted also that the advertising sheets are effectively protected against soiling and disarrangement, and against displacement or removal from their advantageous display location. Thus the advertiser has definite assurance of effective display of his advertising at the point of sale.

A modified embodiment of the invention is illustrated in Figs. 3, 4 and 5. Here the brackets 12' for a unit are securely bolted to the counter in spaced relationship and joined by a rear connecting member 14' and a front rail 15'. The rear connecting member and the front rail have horizontaly presented ledges 28 and 29 which are spaced apart vertically, and the brackets are provided with correspondingly spaced ledges 30 and 31. One or more lamp supports 20' are carried on the rear connecting member 14' and support electric light bulbs 21' at a suitable distance below the ledges 28. The front rail 15' is removably bolted to the brackets.

The sheet-supporting plate 19' is supported on the ledges 28 and 31, and supports the advertising sheet 24'. Overlying said sheet is a transparent pane 18'. The sheet-supporting plate 19' is preferably transparent or translucent, and the advertising sheet 24' is suitably translucent to permit a suitable amount of light from the lamps 21' to pass through and show the advertising matter on the sheet 24' with suitable contrast. If the unit is in a location otherwise well illuminated from above, the lamps 21 may be eliminated and the sheet-supporting plate 19' may be opaque. The ledges 29 and 30 form a frame for the display and retain the pane 18' in place.

When the rail 15' is dismounted, the pane and the advertising sheets may be withdrawn to permit insertion of new advertising sheets, and the sheet-supporting plate 19' also may be withdrawn if desired.

As a guard for the pane, the rigid strips 26' may be provided and arranged at suitable intervals, and mounted on the frame ledges 29 by insertion of their end portions into upwardly pressed sockets 34, being thus securely supported by the unsevered portions 29' of the frame ledges 29.

It will be observed that a unit of the construction last described provides a forward extension of the work surface of the counter and that it presents the advertising sheets immediately under the eye of the purchaser, and affords them suitable illumination as well as entire protection against defacement and displacement. It will also be observed that the unit may be serviced with facility, for changing the advertising sheets, simply by demounting the front rail 15' and withdrawing the pane.

It is also to be noted that the above described invention substantially increases the facilities of the store for displaying advertising, and that it does so without encroaching on the working space of the counter, or on the wall space, and without interfering with the use of the counter or the aisles by the storekeeper or the customers. In fact it affords the customer added convenience as a place where she may lay parcels, handbag, etc. while transacting her business, without interfering with the use of the counter, and, in stores where stools or chairs are used for the patrons while examining merchandise, as in drygoods stores, it contributes to the ease and comfort of the patron by affording space for the knees when seated.

What I claim is:

1. A device for display of advertising comprising, in combination, a counter having an approximately horizontal work surface, brackets secured to said counter and extending forwardly therefrom in spaced relation to each other, a transparent pane supported by said brackets in horizontal position at a level approximately flush with the counter work surface, and means for supporting a display sheet below said pane in position where it is visible therethrough.

2. A device for display of advertising comprising, in combination, a counter having an approximately horizontal work surface, brackets secured to said counter and extending forwardly therefrom in spaced relation, a transparent pane supported by said brackets in horizontal position adjacent the counter work surface, means for supporting a display sheet below said pane in position where it is visible therethrough, and an illuminating element disposed below said pane in position to illuminate such advertising sheet.

3. In a device for display of advertising, in combination, a counter having an approximately horizontal work surface, brackets secured to said counter and extending forwardly therefrom in spaced relation, a transparent pane removably supported by said brackets in horizontal position at approximately the level of the counter work surface, and means for supporting a display sheet below said pane in position where it is visible therethrough.

4. A device for display of advertising comprising, in combination, a counter having an approximately horizontal work surface, brackets secured to said counter and extending forwardly therefrom in spaced relation, a transparent pane supported by said brackets in horizontal position approximately at the level of the counter work surface, and a sheet-supporting plate supported by said brackets below said pane in position to support a display sheet for observation through the pane.

5. In a device for displaying advertising sheets in combination, a counter having an approximately horizontal top work surface, brackets secured to the upper portion of said counter and extending forwardly therefrom in spaced relation to each other, a frame supported by said brackets in approximately the same plane as the counter work surface, a transparent pane retained by said frame in horizontal position, and means below said pane for supporting a display sheet in position for observation therethrough.

6. A device for displaying advertising sheets comprising, in combination, a counter having an approximately horizontal top work surface, brackets secured to the upper portion of said counter and extending forwardly therefrom in spaced relation to each other, a frame supported by said brackets in approximately the same plane as the counter work surface, a transparent pane retained by said frame in horizontal position, means supported by said brackets for supporting a display sheet for observation through said pane, and an illuminating element disposed below said pane in position for illuminating the display sheet.

7. In a device for displaying advertising sheets, in combination, a counter having an approximately horizontal top work surface, brackets secured to the upper portion of said counter and extending forwardly therefrom in spaced relation to each other, a frame supported by said brackets in approximately the same plane as the counter work surface, a transparent pane retained by said frame in horizontal position, and a sheet-supporting plate below said pane and cooperating therewith and with said brackets to form a support and enclosure for a display sheet arranged for observation through said pane.

8. A device for displaying advertising sheets as specified in claim 7 and wherein either or both said pane and plate are movable to permit insertion and removal of the display sheet.

9. A device for displaying advertising sheets comprising the combination of a counter having an approximately horizontal work surface, brackets secured to and extending forwardly from said counter in spaced relation to each other, front and rear connecting members connecting said brackets, a transparent pane supported by said brackets in a horizontal position at approximately the level of said work surface, a sheet supporting plate supported by said brackets below the pane and cooperating therewith to enclose a display sheet in a position visible through said pane, and an illuminating device supported by one of said connecting members in position to illuminate such display sheet.

10. A device for displaying advertising comprising, in combination, a counter having a top working surface, a transparent pane extending outwardly from the counter in horizontal position at approximately the level of the working top, means for supporting a display sheet below said pane in position for observation therethrough, and means attached to the counter for supporting said pane and sheet-supporting means.

HERBERT C. ILLIUM.